(12) United States Patent
Fujiyama et al.

(10) Patent No.: US 6,767,983 B1
(45) Date of Patent: Jul. 27, 2004

(54) SILICONE RESIN AND PHOTOSENSITIVE RESIN COMPOSITION CONTAINING THE SAME

(75) Inventors: Takeshi Fujiyama, Kisarazu (JP); Takero Teramoto, Tokyo (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/937,598
(22) PCT Filed: Mar. 29, 2000
(86) PCT No.: PCT/JP00/01955
§ 371 (c)(1), (2), (4) Date: Sep. 28, 2001
(87) PCT Pub. No.: WO00/59987
PCT Pub. Date: Oct. 12, 2000

(30) Foreign Application Priority Data

Mar. 30, 1999 (JP) ............................................. 11-089441

(51) Int. Cl.⁷ ...................... C08G 77/14; C08G 77/04
(52) U.S. Cl. ............................ 528/26; 528/12; 528/33; 528/41; 525/474
(58) Field of Search ........................... 528/12, 26, 33, 528/41; 525/474; 252/582; 430/270.1, 272.1

(56) References Cited

U.S. PATENT DOCUMENTS

| | | | |
|---|---|---|---|
| 5,385,804 A | | 1/1995 | Premlatha et al. |
| 5,612,170 A | * | 3/1997 | Takemura et al. ........ 430/270.1 |
| 6,210,856 B1 | * | 4/2001 | Lin et al. .................. 430/270.1 |
| 6,284,858 B1 | | 9/2001 | Fujiyama et al. |
| 6,303,268 B1 | * | 10/2001 | Namba et al. ........... 430/270.1 |
| 6,309,796 B1 | * | 10/2001 | Nakashima et al. ..... 430/287.1 |

FOREIGN PATENT DOCUMENTS

| | | |
|---|---|---|
| JP | A11-60734 | 3/1999 |
| WO | A9/841566 | 9/1998 |

OTHER PUBLICATIONS

English Abstract of JP 06–027671, Feb. 1994, Sachdev et al.*
English Abstract of JP 06–095385, Apr. 1994, Premlatha et al.*
English Abstract of JP 06–248082, Sep. 1994, Lagarde et al.*
English Abstract of JP 06–329687, Nov. 1994, Freyer et al.*
English Abstract of JP 07–056354, Mar. 1995, Iwasa et al.*
English Abstract of JP 08–193167, Jul. 1996, Sakata.*
English Abstract of JP 10–062981, Mar. 1998, Kosaka et al.*
English Abstract of JP 10–251407, Sep. 1998, Fujiyama et al.*

* cited by examiner

*Primary Examiner*—Jeffrey B. Robertson
(74) *Attorney, Agent, or Firm*—Birch, Stewart, Kolasch & Birch, LLP

(57) ABSTRACT

This invention relates to photosensitive silicone resins and resin compositions containing the same. Silicone resins of this invention are characterized by that a triorganosilyl group represented by the following general formula (1)

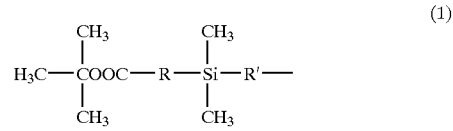

(1)

wherein R is a divalent organic group and R' is a divalent group or a direct bond is linked to all or a part of the ends of the backbone of polyorganosilsesquioxanes. Photosensitive resin compositions of this invention are formulated from the aforementioned silicone resins and a photogenerator of acid. The aforementioned silicone resins and photosensitive resin compositions show excellent performance as resist materials for multi-level resist processes and for forming barriers of PDP and, on account of their excellent plasma resistance (resistance to $O_2$-RIE), yield patterns of a high aspect ratio.

3 Claims, No Drawings

SILICONE RESIN AND PHOTOSENSITIVE RESIN COMPOSITION CONTAINING THE SAME

This application is the national phase under 35 U.S.C. § 371 of PCT International Application No. PCT/JP00/01955 which has an International filing date of Mar. 29, 2000, which designated the United States of America.

FIELD OF TECHNOLOGY

This invention relates to silicone resins and photosensitive resin compositions containing the same useful as resist materials.

BACKGROUND TECHNOLOGY

In the fields of a variety of electronic devices including semiconductor devices that require microfabrication, there is a rising demand for higher density and higher degree of integration of devices and finer patterning has become essential to meet this demand. Moreover, in plasma display panels (PDP), barriers of a high aspect ratio, that is, a high ratio of height to width, are in demand in order to have light of high luminance emitted by enlarging the electric discharge space for display.

A method for obtaining higher resolution in patterning is to use light of shorter wavelength in patterning of photoresists. However, the use of shorter wavelength poses a problem of the depth of focus (DOF) becoming reduced with a drop in sensitivity and aspect ratio. Multi-level resist processes have been proposed to solve this problem. According to a process of this kind, a material such as novolac and polyimide that can be readily dry-etched by oxygen plasma is deposited by spin coating on a substrate and planarized, a resist resistant to dry etching by oxygen is applied to the surface of the planarized layer, a pattern is formed, and then the pattern is transferred to the bottom layer by anisotropic etching by oxygen plasma. As this process yields patterns of a high aspect ratio, developmental works are being conducted extensively on resist materials resistant to oxygen plasma etching.

Resist materials utilizing silicone resins are known to be highly resistant to oxygen plasma etching and, for example, compositions consisting of ladder type polysiloxane esters or polysiloxanes substituted with epoxy-containing alkyl groups and a photosensitive compound capable of generating acid upon exposure to light are proposed in JP 7-56354 (1995)A1 and JP 8-193167 (1996)A1. Moreover, resist compositions containing photosensitive silicone resins that are polysiloxanes to which a diazonaphthoquinonesulfonyloxy group and an azido group are linked are proposed in JP 6-27671 (1994)A1 and JP 6-95385 (1994)A1.

As for the barrier (rib) of a plasma display panel (PDP), a process for constructing a rib with the use of a paste formulated from photosensitive resins and inorganic powders to raise the aspect ratio is described in JP 10-62981 (1998)A1. The photosensitive resins in question are acrylic polymers and the like.

Polyorganosilsesquioxanes are occasionally abbreviated to polysiloxanes and they are known to occur in three types, that is, cage, ladder, and random. Their structures and methods of preparation are described in detail in the specifications of WO98/41566, JP 50-139900 (1975)A1, JP 6-329687 (1994)A1, JP 6-248082 (1994)A1 and elsewhere. A method for introducing functional groups to the ends of these polyorganosilsesquioxanes is also described in detail in the aforementioned WO98/41566.

An object of this invention is to provide photosensitive silicone resins which exhibit excellent performance as resist materials for multi-level resist processes and for forming PDP barriers. Another object of this invention is to provide resist materials which exhibit excellent plasma resistance (resistance to $O_2$-RIE) and form patterns of a high aspect ratio.

DISCLOSURE OF THE INVENTION

This invention relates to silicone resins composed of polyorganosilsesquioxanes whose ends are partly or wholly linked to a triorganosilyl group represented by the following general formula (1)

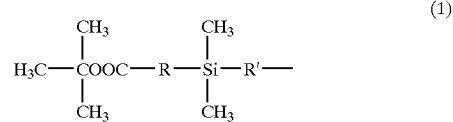

(wherein R is a divalent organic group and R' is a divalent group or a direct bond).

This invention also relates to the aforementioned silicone resins wherein the polyorganosilsesquioxanes have a repeating unit represented by the following general formula (2)

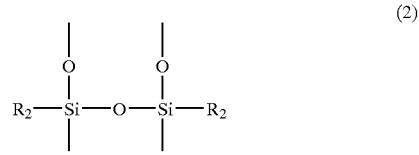

(wherein $R_2$ is an unsubstituted or substituted phenyl group) and the average number of repeating units is 2–5,000.

Furthermore, this invention relates to the aforementioned silicone resins wherein the polyorganosilsesquioxanes consist of one type or a mixture of two types or more selected from ladder type, cage type, and mixed cage-ladder type and the weight average molecular weight Mw is 800–100,000 as determined by gel permeation chromatography (GPC) and calibrated against polystyrene.

Still more, this invention relates to the aforementioned silicone resins wherein R is —$R_1COOX_1$— or —$R_1COOX_1$—Si$(CH_3)_2$—O— (wherein $R_1$ is the divalent residue of a polycarboxylic acid or derivative thereof and $X_1$ is a divalent group).

Still further, this invention relates to photosensitive resin compositions formulated from the aforementioned silicone resins and a photogenerator of acid.

Finally, this invention relates to a process for preparing the aforementioned silicone resins which comprises treating polyorganosilsesquioxanes with X—Si$(R_3)_2$—Y or X—Si$(R_3)_2$OSi$(R_3)_2$—Y [wherein X and Y are groups capable of linking with carboxyl groups or functional groups capable of reacting with terminal OH groups or terminal OM groups is an alkali metal) of the backbone of polyorganosilsesquioxanes and $R_3$ is a monovalent organic group] to give modified polyorganosilsesquioxanes containing X or Y at all or a part of their terminal positions, and treating the terminal groups with t—BuOOC—$R_1$—COOH (wherein t—Bu is t-butyl group and $R_1$ is the divalent residue of a polycarboxylic acid or derivative thereof). The group $R_3$ here is a monovalent organic group such as alkyl and aryl, preferably methyl, and $R_3$ in a given molecule may be of the same kind or of two or more kinds.

Photosensitive silicone resins of this invention are structurally polyorganosilsesquioxanes to which a triorganosilyl group represented by the aforementioned general formula (1) is linked to all or a part of the ends of the backbone chain. The backbone chain may be represented by the general formula $(R_2Si_2O_3)_n$ and n designates the number of repetition and is 2 or more. Preferable polyorganosilsesquioxanes have a repeating unit represented by the aforementioned general formula (2) and the average number of repeating units is 2–5,000, more preferably 5–500. The group $R_2$ is a monovalent organic group and may be a hydrocarbon group such as aryl and alkyl and an alkoxy group, but $R_2$ is preferably an alkyl group with 1–6 carbon atoms or an unsubstituted or substituted phenyl group, more preferably a phenyl group.

In the triorganosilyl group represented by the general formula (1), R is a divalent organic group and, as indicated by the aforementioned general formula (1), R may be said to contain the residue of a carboxylic acid. The group R' designates a divalent group or a direct bond and, in the case of a divalent group, it is linked on the other side to the terminal Si—O— group of polyorganosilsesquioxanes. The t-butyl group at the end of of the triorganosilyl group comes off to leave a free carboxyl group behind when it contacts the acid generated from a photogenerator of acid thereby enhancing the the alkali solubility of silicone resins and it is this property that is utilized in patterning.

Carboxylic acids which give the divalent group R include monocarboxylic acids such as benzoic acid and acetic acid and polycarboxylic acids and they are preferably polycarboxylic acids. Such polycarboxylic acids include pyromellitic acid, trimellitic acid, phthalic acid, biphenyldicarboxylic acid, biphenyltetracarboxylic acid, biphenylhexacarboxylic acid, benzophenonedicarboxylic acid, benzophenonetetracarboxylic acid, diphenyl ether dicarboxylic acid, diphenyl ether tetracarboxylic acid, diphenyl sulfone dicarboxylic acid, diphenyl sulfone tetracarboxylic acid, diphenyl sulfide dicarboxylic acid, diphenyl sulfide tetracarboxylic acid, benzanilidedicarboxylic acid, benzanilidetricarboxylic acid, benzanilidetetracarboxylic acid, benzanilidepentacarboxylic acid, cyclohexanedicarboxylic acid, cyclohexenedicarboxylic acid, succinic acid, adipic acid, maleic acid, and fumaric acid.

In the case of polycarboxylic acids, the carboxyl group not linked to t-butyl group may be present as free carboxyl (—COOH) or in the form of ester or salt. In particular, it is preferable that one of the carboxyl groups forms an ester linkage with Si either directly or through a divalent group X as illustrated by t—Bu—OOC—$R_1$—COO—X—Si(Me)$_2$—. Here, the group R in the general formula (1) corresponds to $R_1$—COOX and X is a divalent group such as alkylene or arylene or a direct bond.

In case polycarboxylic acids is tricarboxylic or higher acids, at least one of the carboxyl groups remains intact and it may remain so or it may be converted to the neutral form such as ester and salt. Alkali solubility becomes poorer if the carboxyl group in question exists in the neutral form such as ester. The acid from a photogenerator of acid contributes to enhance alkali solubility by dissociating the t-butyl group and generating a carboxylic acid. In the cases in which patterning is effected by utilizing this phenomenon, there should desirably be a large difference in alkali solubility between the exposed and unexposed regions and, for this reason, the free carboxyl groups are converted to esters, preferably to t-butyl esters by treating with t-butyl alcohol or derivative thereof.

The group R may contain not only the residue of a carboxylic acid but also a part of the residue of a terminal modifier which modifies the ends of polyorganosilsesquioxanes as described above. A suitable terminal modifier can be represented by X—Si(CH$_3$)$_2$—Y in which Y is a functional group capable of linking to the backbone polyorganosilsesquioxanes and X is a functional group capable of linking to a group such as carboxyl. For example, a terminal modifier represented by X—Si(CH$_3$)$_2$—O—Si(CH$_3$)$_2$—Y [wherein Y is a functional group such as epoxy capable of reacting with the terminal OH or OM group (M is an alkali metal)] reacts with polyorganosilsesquioxanes at one end through Y to give polyorganosilsesquioxanes containing X at the other end. The X-terminated polyorganosilsesquioxanes then react with the aforementioned polycarboxylic acid or derivative thereof to give a product whose R contains —CH$_2$—CH(OH)— in case X is an epoxy group. A variety of groups such as ester and amide can be formed by changing X. In the aforementioned terminal modifier, X and Y may naturally be identical with or different from each other, but one of them needs to be reactive with the terminal group (or terminal group being generated during the reaction) of polyorganosilsesquioxanes and the other needs to be reactive with a group such as carboxyl or derivative thereof. As is apparent from the above description, the backbone polyorganosilsesquioxanes and the triorganosilyl group represented by the general formula (1) are linked not necessarily through a siloxane linkage but through an appropriate group.

Photosensitive silicone resins of this invention can be prepared by utilizing a known reaction. In the case of polyorganosilsesquioxanes containing terminal silanol, for example, the terminal modification is effected by treating the polymers with a monohalide such as X—Si(CH$_3$)$_2$—Cl. One of preferable procedures for terminal modification is to treat polyorganosilsesquioxanes such as silanol-free cage type and/or ladder type octaphenylsesquioxane with a terminal modifier such as the aforementioned X—Si(R$_3$)$_2$—O—Si(R$_3$)$_2$—X in the presence of an alkali metal catalyst to give X-terminated polyorganosilsesquioxanes.

A silicon atom in polyorganosilsesquioxanes and the silicon atom in a terminal modifier such as X—Si(CH$_3$)$_2$—Y tend to undergo exchange reaction and a procedure utilizing this property is also effective for terminal modification. In this case, at least one of X and Y needs to be reactive with a carboxyl group. Moreover, it is possible to effect the aforementioned reaction and the exchange reaction simultaneously by using Y as a group capable of reacting with the end of polyorganosilsesquioxanes.

A preferable procedure for preparing silicone resins of this invention from terminally modified polyorganosilsesquioxanes is, for example, to treat the terminally modified polyorganosilsesquioxanes with an acidic ester prepared by the reaction of t-butyl alcohol with a polycarboxylic acid or derivative thereof such as acid anhydride in the presence of a quaternary ammonium salt as a catalyst.

Silicone resins of this invention have a weight average molecular weight of 800–100,000, preferably 5,000–50,000, as determined by GPC and calibrated against polystyrene. The silicone resins in question are solid at normal temperature and soluble in many organic solvents such as esters and ethers. Furthermore, silicone resins of this invention are preferably polyorganosiloxanes represented by the general formula $(C_6H_5S_{3/2})_n$ having a triorganosilyl group represented by the general formula (1) at all or 10% or more of their replaceable ends, for example, one triorganosilyl group for n=4–20, preferably one for n=2–8.

Silicone resins of this invention are best suited for use as positive resist materials. In such end uses, it is possible to incorporate generators of acid or a variety of additives in order to enhance sensitivity or improve heat or a plasma resistance.

Additives indispensable to photosensitive resin compositions of this invention are photogenerators of acid. Such photogenerators of acid include, but are not limited to, sulfonium salts such as triphenylsulfonium trifluorosulfonate, triphenylsulfonium trifluoromethaneantimonate, triphenylsulfonium benzenesulfonate, and cyclohexylmethyl(2-oxocyclohexyl) sulfonium trifluoromethanesulfonate, iodonium compounds such as diphenyliodonium trifluoromethanesulfonate, and N-hydroxysuccinimide trifluoromethanesulfonate. A detailed description of the chemical formulas and actions of these photogenerators of acid is found in the aforementioned JP 8-193167 (1996)A1 and "New Development of Practical Polymer Resist Materials", p. 57 (in Japanese) published by CMC. A photogenerator of acid is normally added at a rate of 0.2–25% by weight of total solids.

An organic solvent is used to adjust the viscosity. Preferable solvents include, but are not limited to, Methyl Cellosolve acetate, propylene glycol monoethyl ether acetate, methyl lactate, ethoxyethyl acetate, methyl pyruvate, methyl methoxypropionate, N-methylpyrrolidinone, cyclohexanone, methyl ethyl ketone, dioxane, ethylene glycol monomethyl ether acetate, and diethylene glycol monoethyl ether.

Photosensitive resin compositions of this invention contain the aforementioned photosensitive silicone resins and photogenerators of acid as indispensable components and often contain solvents. In addition, it is permissible to incorporate surfactants, colorants, stabilizers, coating improvers, and inorganic powders as needed.

Photosensitive silicone resins of this invention and their compositions can be used as resist materials and barrier materials of PDP. Although there is no restriction on the mode of their use as resist material, they are best suited for multi-level resist processes.

According to a multi-level resist process, a material such as novolac which can be readily dry-etched by oxygen plasma is applied by spin coating to the surfaceof a substrate, a material of this invention is applied thereto, the layers are exposed to a laser such as excimer to generate acid from a photogenerator of acid and let the acid dissociate silicone resins, patterning is effected by developing with an aqueous alkaline solution, and the bottom layer resist is etched by oxygen plasma to give a pattern of a high aspect ratio.

As for the preparation of barrier materials of PDP, methods such as sandblasting, embedding, and photopaste are known. Since any of the methods uses photosensitive resist materials, materials of this inventin can be used as such. In particular, when applied to the photopaste method or the like in which the resist remains unremoved, materials of this invention can fully produce the effect of excellent plasma resistance.

PREFERRED EMBODIMENTS OF THE INVENTION

Example 1

Phenylsilsesquioxane containg glycidyl group was synthesized with reference to Reference Example 1 and Example 3 described in PCT/JP98/01098 (WO98/41566) and JP 10-251407 (1998)A1.

Synthetic Example 1

Synthesis of Cage Type Octaphenylsilsesquioxane

In 500 cc of toluene was dissolved 105 g (0.5 mole) of phenyltrichlorosilane and the mixture was shaken with water until the hydrolysis was completed. The hydrolysis product was washed with water, mixed with 16.6 cc (0.03 mole) of commercially available 30% methanol solution of benzyltrimethylammonium hydroxide, and the mixture was heated at reflux temperature for 4 hr.

Thereafter, the whole mixture was cooled and left standing for approximately 96 hr. After this time elapsed, the resulting slurry was again heated at reflux temperature for 24 hr, cooled, and filtered to give about 75 g of cage type octaphenylsilsesquioxane $(C_6H_5SiO_{3/2})_8$. In infrared spectrometry of the product, absorption bands assignable to Si—$C_6H_5$ were observed at 1595 cm$^{-1}$ and 1430 cm$^{-1}$ and an absorption band assignable to the antisymmetric stretching vibration of Si—O—Si was observed at 1135 cm$^{-1}$ while an absorption band assignable to Si—OH was not observed at 3400 cm$^{-1}$. In $^{29}$Si-MASNMR determination, only one sharp signal of Si nucleus in the cage type octaphenylsilsesquioxane was observed at −77 ppm. The number average molecular weight Mn was 760 when determined by GPC with o-dichlorobenzene used as a flowing solvent and calibrated against polystyrene.

Synthetic Example 2

Synthesis of Phenylsilsesquioxane Oligomer Containing Glycidyl Group

To a reaction vessel were added 100 g of the cage type octaphenylsilsesquioxane, 70.3 g of 1,3-bis(3-glycidoxypropyl)-1,1,3,3-tetramethyldisiloxane, 400 g of toluene, and 4 g of tetramethylammonium hydroxide pentahydrate and the mixture was heated at reflux temperature with vigorous stirring for 7 hr. The reaction mixture was a white suspension at the start because white powders of the the cage type octaphenylsilsesquioxane did not dissolve in toluene, but the powders gradually dissolved as the reaction progressed and nearly all of them dissolved after 7 hr to give a colorless transparent solution. The solution was cooled to room temperature, a precipitate of the unreacted tetramethylammonium hydroxide was removed by filtration, and the filtrate was poured into 2,000 g of excess methanol to reprecipitate phenylsilsesquioxane containing a terminal glycidoxy group. The viscous precipitate was washed with methanol and distilled to strip off the methanol and the residual toluene to give 120 g of glycidyl-containing phenylsilsesquioxane oligomer as a pale yellow transparent viscous product. The epoxy equivalent as determined by the hydrochloric acid-pyridine method was 945 g/eq. The number average molecular weight Mn determined by GPC and calibrated against polystyrene was 20,000.

Synthetic Example 3

Synthesis of Carboxylic Acid Containing t-Butyl Ester Group

To a 1-l three-necked flask were added 62 g of maleic anhydride, 74 g of sodium t-butoxide, and 400 g of propylene glycol monomethyl ether acetate, 0.44 g of sodium methoxide was added as a catalyst, and the mixture was heated under reflux at 150° C. for 2 hr. The mixture was allowed to cool to room temperature and 0.85 g of concentrated hydrochloric acid was added. The resulting brown reaction mixture was placed in an eggplant-shaped flask and the solvent propylene glycol monomethyl ether acetate was distilled off in an evaporator. Thereafter, the remainder was dissolved in 600 of dichloromethane andwashed with 500 g of distilled water three times. The dichloromethane was evaporated off to give a carboxylic acid containing a t-butyl ester group as a brown viscous liquid in 90% yield.

Synthetic Example 4

Synthesis of Phenylsilsesquioxane Containing t-Butyl Ester Group

To a three-necked flask were added 100 g of the glycidyl-containing phenylsilsesquioxane oligomer prepared in Synthetic Example 2, 14 g of the carboxylic acid containing a t-butyl ester group prepared in Synthetic Example 3, 100 g of propylene glycol monomethyl ether acetate as a solvent, and 0.2 g of tetraethylammonium bromide as a catalyst and the mixture was heated at 90° C. with stirring for 2 hr to give phenylsilsesquioxane containing a t-butyl ester group as a brown viscous liquid in 80% yield.

Example 2

(1) Experiments on Pattering Using Resins of this Invention

A photosensitive resin solution was prepared by dissolving 1 g of triphenylsulfonium triflate ($Ph_3S^+OTf^-$) or a photogenator of acid in 100 g of a solution of the phenyl-silsesquioxane containing t-butyl ester group prepared in Example 1 in propylene glycol monomethyl ether acetate and the solution was applied by spin coating to a glass substrate and dried at 70° C. for 15 minutes to form a 0.3 μm-thick film. The film was irradiated with UV (248 nm) through a mask and developed by a 3% aqueous solution of tetramethylammonium hydroxide to give a clear pattern (line and space 0.3 μm). It was confirmed that the resin exhibits a property of positive resist.

(2) Experiments on Two-level Resist Patterning Using Resins of this Invention

A silicon wafer was spin-coated with a 1 a m-thick bottom resist layer of cresol novolac and a 0.1 μm-thick top positive resist layer of the phenylsilsesquioxane containing t-butyl ester group prepared in Example 1, exposed to far UV (193 nm) excimer laser, and developed with a 2% aqueous solution of tetramethylammonium hydroxide to form a dear pattern in the top layer (line and space 0.1 μm). Thereafter, the bottom resist was etched by $O_2$—RIE and the top resist was removed by $CF_4$—RIE to form clearly patterned cresol novolac with a linewidth of 0.1 μm and an aspect ratio of 10.

Industrial Applicability

Silicone resins of this invention and their compositions give resists of excellent plasma resistance and make precision patterning of electronic devices feasible. They are also well suited for barrier materials of PDP and, moreover, exhibit excellent performance as resist materials for multi-level resist processes and for forming barriers of PDP. In addition, they exhibit excellent plasma resistance (resistance to $O_2$-RIE) and, when used in patterning, give patterns of a high aspect ratio.

What is claimed is:

1. Silicone resins wherein a triorganosilyl group represented by the following general formula (1)

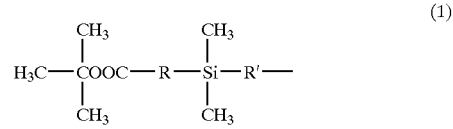

wherein R is a divalent organic group and R' is a divalent group or a direct bond is linked to all or a part of the ends of the backbone chain of polyorganosilsesquioxanes.

2. Silicone resins as described in claim 1 wherein the polyorganosilsesquioxanes contain a repeating unit represented by the following general formula (2)

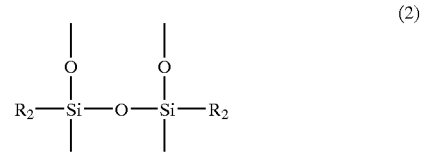

wherein $R_2$ is an unsubstituted or subsituted phenyl group and the average number of repeating units is 2–5,000.

3. Silicone resins as described in claim 1 wherein the polyorganosilsesquioxanes consist of one type or a mixture of two types or more seleted from ladder type, cage type, and mixed cage-ladder type and their weight average molecular weight Mw determined by gel permeation chromatography (GPC) and calibrated against polystyrene is 800–100,000.

* * * * *